(12) United States Patent
Antoniazzi et al.

(10) Patent No.: US 9,884,732 B2
(45) Date of Patent: Feb. 6, 2018

(54) DEVICE TO FEED PRODUCTS AND TO OVERTURN THEM IN AN INFEED LINE

(71) Applicant: Fabio Perini S.p.A., Lucca (IT)

(72) Inventors: Luca Antoniazzi, Bologna (IT); Gabriele Canini, San Giorgio di Piano (IT)

(73) Assignee: Fabio Perini S.p.A., Lucca (IT)

( * ) Notice: Subject to any disclaimer, the term of this patent is extended or adjusted under 35 U.S.C. 154(b) by 100 days.

(21) Appl. No.: 15/133,845

(22) Filed: Apr. 20, 2016

(65) Prior Publication Data
US 2016/0311627 A1    Oct. 27, 2016

(30) Foreign Application Priority Data

Apr. 21, 2015  (IT) ................................ FI2015A0114

(51) Int. Cl.
| | |
|---|---|
| *B65G 29/00* | (2006.01) |
| *B65G 47/252* | (2006.01) |
| *B65G 47/248* | (2006.01) |
| *B65G 47/244* | (2006.01) |
| *B65G 17/16* | (2006.01) |

(52) U.S. Cl.
CPC ........... *B65G 47/244* (2013.01); *B65G 17/16* (2013.01); *B65G 47/252* (2013.01)

(58) Field of Classification Search
CPC .... B65G 29/00; B65G 47/244; B65G 47/248; B65G 47/252
USPC ................................ 198/406, 411, 412, 413
See application file for complete search history.

(56) References Cited

U.S. PATENT DOCUMENTS 8,151,971 B2    4/2012  Baldanza et al.

*Primary Examiner* — Leslie A Nicholson, III
*Assistant Examiner* — Lester Rushin
(74) *Attorney, Agent, or Firm* — Breiner & Breiner, L.L.C.

(57) ABSTRACT

The device includes a closed path, along which overturning members move, which are configured to pick the products in the entrance position and to release the products in the exit position. The overturning members are configured and arranged to perform, along a segment of the closed path included between the entrance position and the exit position, a rotation by about 90°, in order to overturn the products while translating them from the entrance position to the exit position along the segment of the path.

24 Claims, 12 Drawing Sheets

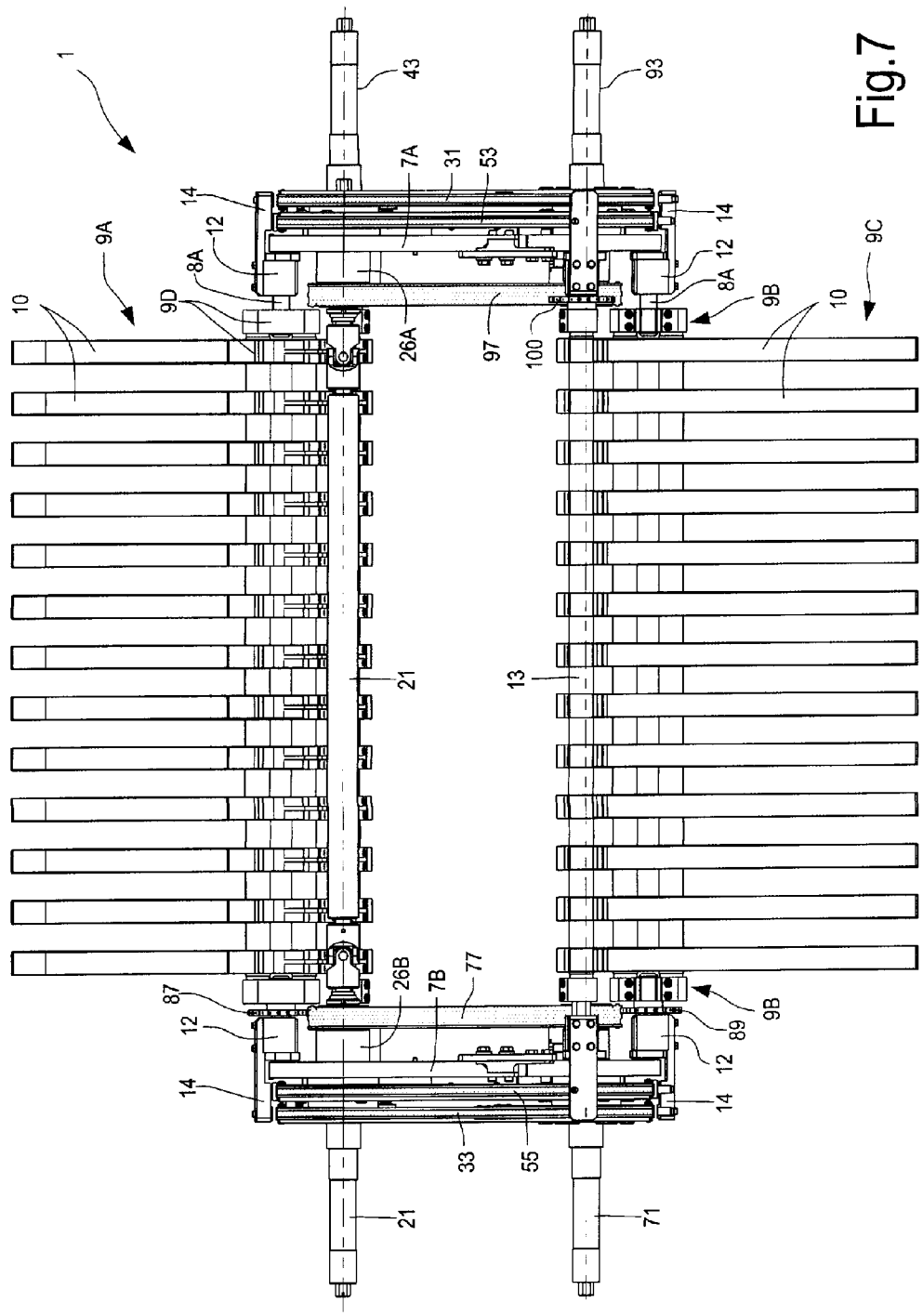

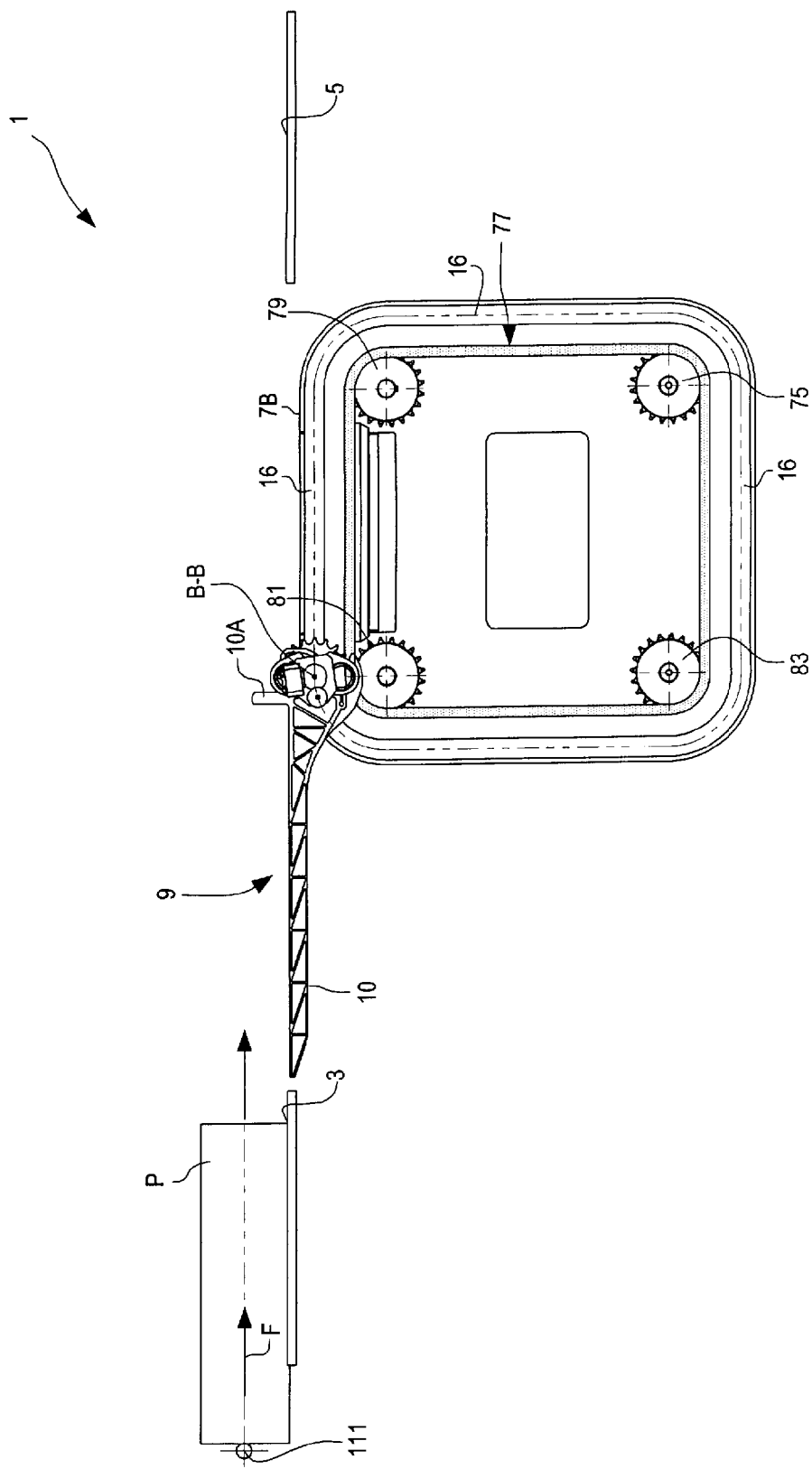

DEVICE TO FEED PRODUCTS AND TO OVERTURN THEM IN AN INFEED LINE

FIELD OF THE INVENTION

The present invention relates to devices for handling products or articles in a packaging line. Some embodiments of the invention relate to devices for handling packs of tissue paper rolls, such as toilet paper, kitchen towels or the like.

BACKGROUND TO THE INVENTION

For the packaging of many industrial products, complex packaging lines are provided, along which the products are fed and processed in sequence. In some packaging lines the products, or product groups, shall move forward and overturn, for instance to change their arrangement, from horizontal to vertical, or vice versa.

EP2001772 discloses a device for transferring packs of articles from an entrance conveyor to an exit conveyor, changing the product orientation. This known device is efficient, but it has some limits that may cause difficulties when interfacing with other components of the line where the device is used.

There is therefore a need for handling devices, especially devices for overturning products or articles in processing lines, that are effective and not bulky, have a limited cost and at least partially overcome one or more drawbacks of the prior art devices.

SUMMARY OF THE INVENTION

According to an aspect, a device is provided to feed products from an entrance position to an exit position, comprising a closed path, along which overturning members move, which are configured to pick the products in the entrance position and to release the products in the exit position; wherein the overturning members are configured and arranged to perform, along a portion of said closed path comprised between the entrance position and the exit position, a rotation by about 90°, in order to overturn the products while translating them from the entrance position to the exit position along said path portion.

According to embodiments described herein, each overturning member is fastened to an endless conveyor extending along the closed path and moved by means of a respective first motor. Moreover, each overturning member may be hinged around a rotation axis transverse with respect to the closed path, so as to rotate around the rotation axis with respect to the endless conveyor, to which it is connected. Moreover, each overturning member may be so configured and arranged as to cooperate with a rotation mechanism controlling the rotation of the overturning member around the rotation axis thereof, depending upon the position of the overturning member along the closed path. The rotation mechanism may comprise a flexible endless member actuated by means of a second motor, wherein the flexible endless member may define a closed path substantially parallel to the closed path along which the endless conveyor extends. The movement of the flexible endless member and the movement of the endless conveyor are coordinated such as to cause translation and overturning of the respective overturning member associated therewith, between the entrance position and the exit position of the products. Practically, the flexible endless member transfers the rotary motion around the hinge axis of the overturning member from the second motor to the overturning member.

In some embodiments a single conveyor is provided with one or more overturning members hinged thereto, and a single rotation mechanism with a single flexible endless member that controls, by means of a single second motor, the rotation of all the overturning members hinged to the endless conveyor. In other embodiments, two endless conveyors are provided, for example, preferably arranged along the same closed path, wherein one overturning member or a plurality of overturning members is/are hinged to each conveyor. Each conveyor may move by means of a respective first motor. With each conveyor a respective rotation mechanism is associated, provided with a respective flexible endless member, actuated by means of a respective second motor and extending substantially parallel to the respective flexible conveyor. Practically, in this way two first motors are provided to actuate the two endless conveyors, and two second motors are provided to actuate the flexible members. The overturning members are thus subdivided into two series or groups: the overturning members of the first series are hinged to the first endless conveyor, are moved forward along the closed path by means of one of the first motors and are rotated by means of one of the second motors through one of the flexible endless members. The overturning members of the second series are hinged to the second endless conveyor, are moved forward along the closed path by means of the other first motor and are rotated by means of the other second motor.

The entrance position and the exit position can advantageously be approximately at the same height.

According to a further aspect, a device is described to feed products from an entrance position to an exit position, comprising a closed path, along which overturning members move, which are configured to pick the products in the entrance position and to release the products in the exit position; wherein the overturning members are configured and arranged to perform, along a portion of said closed path comprised between the entrance position and the exit position, a rotation by about 90°, in order to overturn the products while translating them from the entrance position to the exit position along said segment of path. The overturning members are subdivided into at least two groups. Each group comprises one or more overturning members, for instance two overturning members. Each group of overturning members may be combined with a respective first motor, controlling the translation of the overturning members of the respective group of overturning members along the closed path. Moreover, each group of overturning members may be combined with a respective second motor, controlling the rotation of the overturning members of the respective group of overturning members around respective rotation axes of the overturning members, the rotation axes being transverse with respect to the closed path. In this embodiment, the number of first motors is essentially equal to the number of groups of overturning members, and the number of second motors is equal to the number of groups of overturning members.

All overturning members of a group are advantageously connected to the respective first motor through a first flexible endless member, for example an endless conveyor, to which each overturning member may be fastened rotating around an own rotation axis transverse to the closed path. All overturning members of a group cooperate with a second flexible endless member actuated by means of the respective second motor. The second flexible endless member, for example a belt or chain, acts as a flexible rack, with which toothed wheels cooperate, that are keyed onto a transverse rotation shaft of each overturning member of the respective group. In this way, the movement of the second flexible member controls synchronously the oscillation of all overturning members of the respective group. The oscillation or rotation movement is coordinated with the translation movement. Thus, the combined motion imparted by the first motor and the second motor defines the overall motion of the overturning members according to the position along the closed path.

By combining the movements of the two motors, it is possible for all the overturning members of the respective group to perform a roto-translation movement coordinated with the position along the closed path.

In advantageous embodiments, the overturning members of the two groups are interposed between one another, so that pairs of consecutive overturning members belong to different groups and therefore perform different movements.

The closed path, along which the overturning members move, may have a horizontal or approximately horizontal active segment, extending from the entrance position to the exit position. However, the active segment may be rectilinear but not horizontal, so that, for example, the entrance position and the exit position are arranged at different height. Even if it is particularly advantageous for the sake of construction easiness, it is not necessary that the active segment is rectilinear. Namely, the active segment may be even curvilinear, or it may have two segments that are both rectilinear but differently inclined, or it may have a rectilinear segment and a curved segment.

Furthermore, the closed path may have a return portion, from the exit position to the entrance position. Advantageously, the movement of the overturning members along the closed path may be performed so that the overturning members exit vertically the horizontal segment where the products move forward, i.e. they exit the segment translating vertically. Thus, they do not interfere with the product while this latter is unloaded towards the downstream station. In this way, the overturning members can start their return path without waiting for the product to move away from the exit position. This simplifies the configuration of the system for transporting the products downstream of the device. In less advantageous embodiments, the movement of the overturning members in the segment downstream of the exit position may have a rotational component. In this case it is possible, for example, to accelerate the exiting products, so as to move them quickly away from the area where the overturning member shall move. Differently, it is possible to slow down or to stop temporarily the movement of the overturning member, so that there is enough time to remove the products, avoiding these latter hinder the movement of the overturning member. It is also possible that the shape or orientation of the trajectory followed by the products during thereof from the exit position is configured to facilitate the movement of the overturning members in the return path.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood by following the description and the accompanying drawing, which shows non-limiting practical embodiments of the invention. More in particular, in the drawing:

FIGS. 6 and 7 are views according to the lines VI-VI and VII-VII of FIG. 3;

FIGS. 8A-8E show a sequence of forward movement and overturning movement of a product by means of the device of FIGS. 1-7.

DETAILED DESCRIPTION OF EMBODIMENTS

Figure 1:
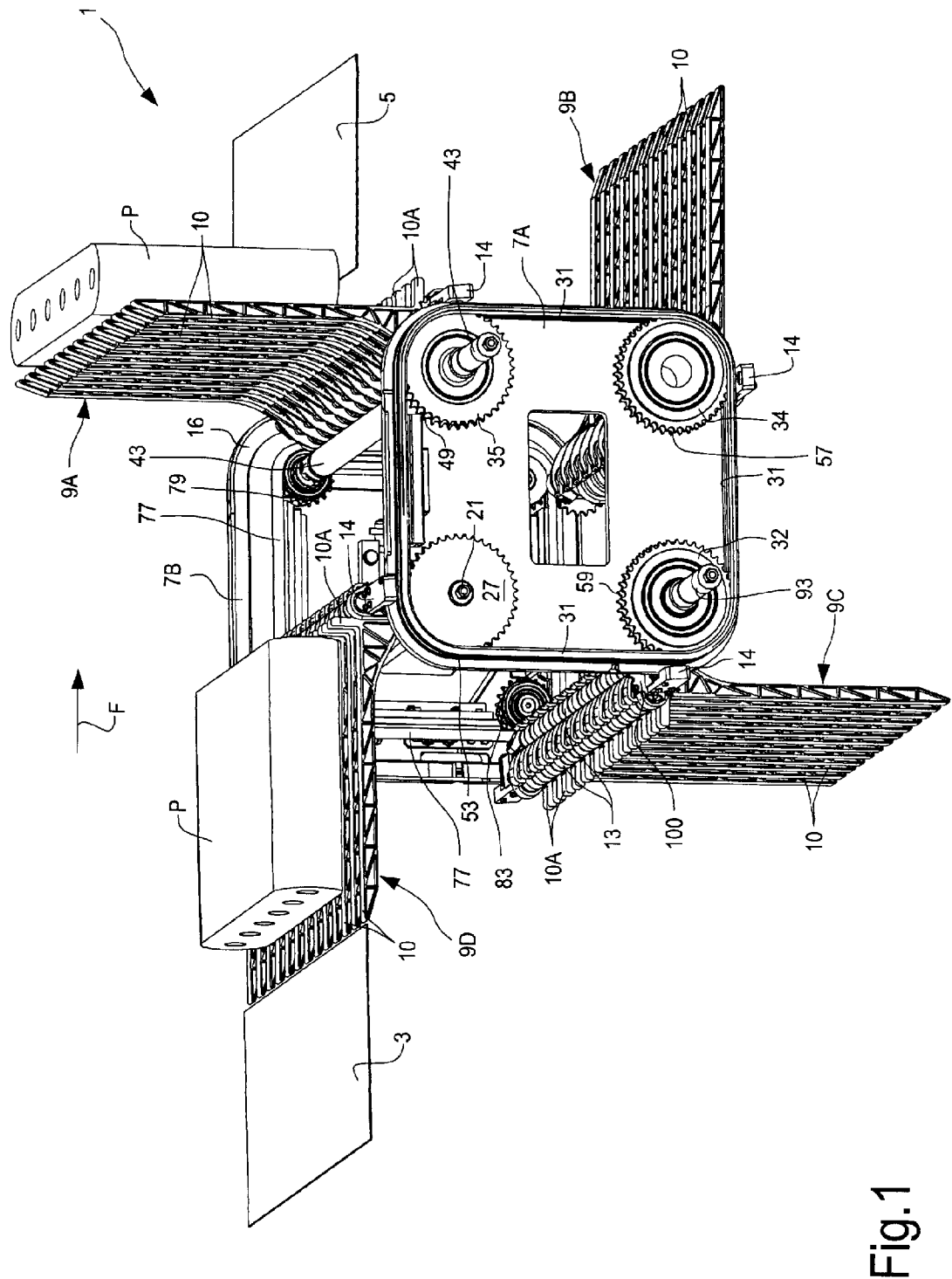
FIGS. 1 and 2 show two axonometric views of a device according to the invention, from opposite sides.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Below a device is described, especially intended for handling packs of tissue paper rolls, such as rolls of toilet paper, kitchen towels or the like. It should however be understood that the device may be also used for handling other products or articles along processing lines, in particular along packaging lines, every time it is necessary to convey and overturn the products, for example to bring them from an entrance position, where they are oriented according to a given direction, to an exit position, where they are oriented according to a second direction.

The device, labeled 1 as a whole in the attached figures, may be arranged, for example, between an entrance position and an exit position of the products P. The entrance position and the exit position are schematically indicated in the attached figures by means of planes 3 and 5. F indicates the overall direction along which the products P move forward.

Practically, the entrance position 3 and the exit position 5 of the products P may be at the same height with respect to a floor on which the device 1 is installed. The entrance position 3 and the exit position 5 of the products P may be for example respectively constituted by the unload area of an entrance conveyor and by the inlet end of an exit conveyor, not shown.

In advantageous embodiments, the device 1 comprises two opposite flanks 7A and 7B. The flanks 7A and 7B may be approximately vertical and parallel to each other. As will be better described below, the flanks 7A and 7B support members and mechanisms suitable to move a plurality of overturning members 9 along a closed path. In the illustrated embodiment, the device 1 comprises four overturning members indicated with 9A, 9B, 9C and 9D. The number of overturning members 9 may be different from that illustrated.

The flanks 7A and 7B also define guides for the overturning members, which move along a closed path extending substantially according to the perimeter edge of the flanks 7A and 7B.

Figure 2:
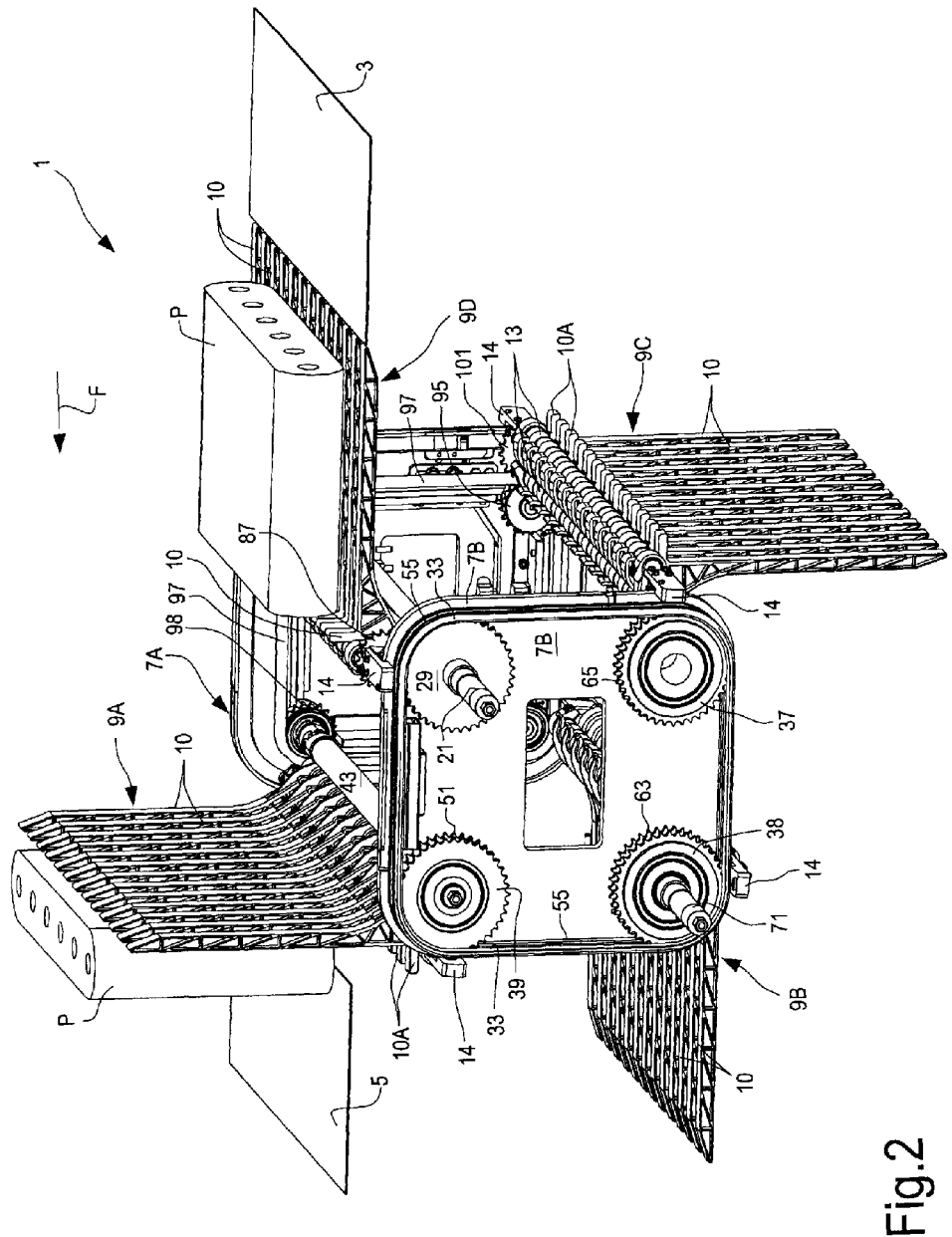
Figure 3:
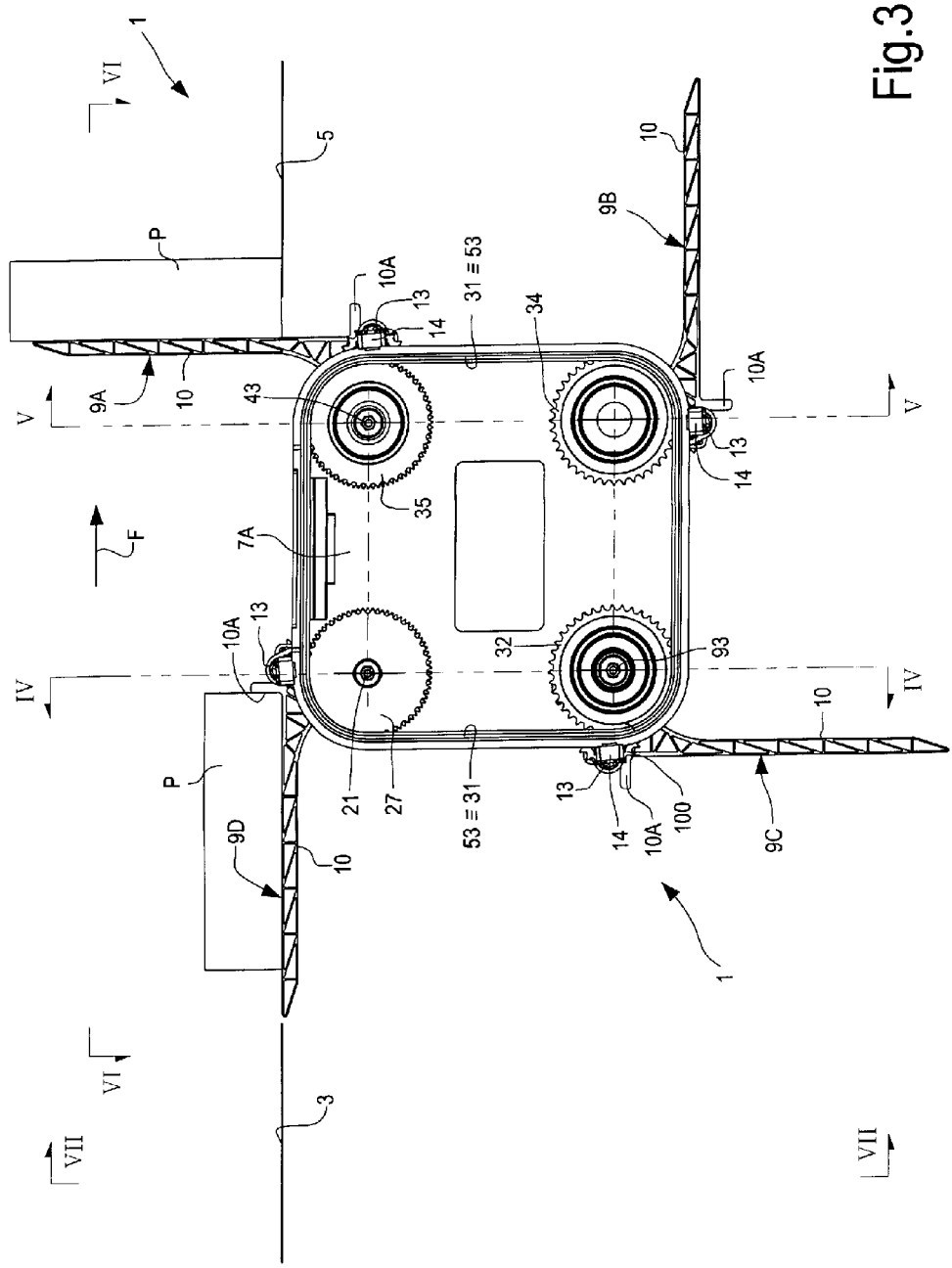
FIG. 3 is a side view of the device of FIGS. 1 and 2.

As shown in FIGS. 1, 2 and 3 and in the sequence of FIGS. 8A-8E, the overturning members 9A-9D perform a translation and rotation movement along the closed path, which in the present example is square-shaped. It will be clearly understood from the description below that the closed path, along which the overturning members 9A-9D move forward, may also have a different shape, for instance a rectangular shape.

A portion or segment of the closed path, along which the overturning members 9A-9D move, extends between the entrance position 3 and the exit position 5. This segment of the closed path is preferably rectilinear.

The overturning members 9A-9D perform a roto-translation movement, typically by about 90°, along the segment of closed path extending between the entrance position 3 and the exit position 5. In the illustrated example, due to the effect of the roto-translation, the overturning members 9A-9D move, for instance, from a horizontal position (overturning member 9D in FIG. 3) to a vertical position (conveyor member 9A in FIG. 3). In this way, the products P, fed in a horizontal position towards the device 1 from the entrance position 3, are transferred to the exit position 5 in a vertical position. It should be understood that the rotation of the products P and of the overturning members 9A-9D may be reversed, so as to transfer and overturn products that enter the device 1 in a vertical position and are unloaded from the device 1 in a horizontal position.

Each overturning member 9A-9D may comprise a plurality of fingers 10.

These fingers 10 may be fastened, for example by means of a snap coupling, to a crossbar extending between the two flanks 7A and 7B. In some embodiments, each crossbar may comprise two parallel beams 13 connected to each other. See in particular FIGS. 1 and 2.

In advantageous embodiments, each finger 10 has a respective appendix 10A approximately orthogonal to the extension thereof. In this way, each overturning member 9A-9D has a substantially L-shaped rest surface for the products P defined by the series of fingers 10 and corresponding appendices 10A.

As it will be clearly apparent from the description below, in this embodiment the overturning members 9A-9D are not independent of one another; namely, they are paired, so that the overturning members 9A, 9C perform synchronous movements that are different from the movements of the overturning members 9B, 9D, which, in turn, move synchronously with each other. In other embodiments, each overturning member 9A-9D is independent of the others, and the rotation and translation movements thereof are controlled by means of own motors. In further embodiments, if the number of overturning members is greater, it is possible to group together more than two overturning members, providing common motors.

As will be clearly apparent from the detailed description below, a double motor is associated with each group of associated overturning members 9A-9D (in the illustrated example, the overturning members 9A, 9C and the overturning members 9B, 9D, respectively). The combination of the motions imparted by means of the two motors allows to move forward and to rotate, in the desired manner and synchronously, all overturning members of a group. The motors can be electric motors, for instance rotary electric motors. In other embodiments the motors are hydraulic motors.

The mechanical components for imparting the combined rotation-translation movement to the overturning members will be described below with particular reference to FIGS. 4 and 5, in combination with FIGS. 1, 2, 6 and 7.

Figure 4:
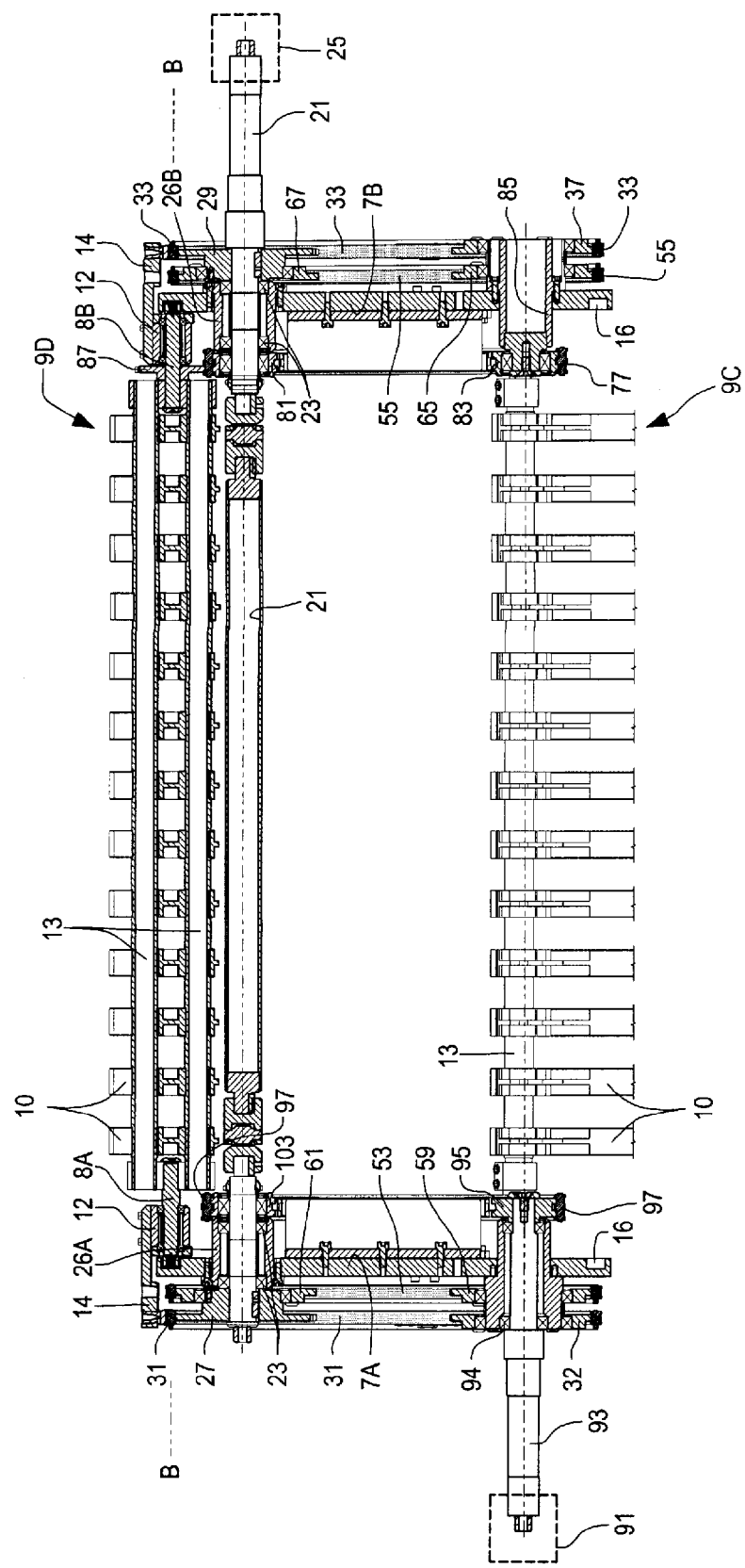
FIGS. 4 and 5 are cross-sections according to the lines IV-IV and V-V of FIG. 3.

As shown in the cross-section of FIG. 4, between the two flanks 7A and 7B a first transverse shaft 21 is supported by means of bearings 23, 24 in respective bushings 26A, 26B integral with the flanks 7A and 7B, respectively. The shaft 21 may be actually comprised of more shaft segments, joined together by means of universal joints or the like. The shaft 21 is driven into rotation by means of a first motor 25, schematically shown in FIG. 4.

A first toothed wheel 27 and a second toothed wheel 29 are keyed onto the shaft 21. A chain 31 is driven around the toothed wheel 27, while a chain 33 is driven around the toothed wheel 29. The two chains 31, 33 constitute a pair of flexible endless members forming a first endless conveyor extending along the closed path followed by the overturning members 9A-9D. In other embodiments, endless belts are used, preferably toothed endless belts, instead of the endless chains 31, 33.

The endless chain 31 is driven not only around the drive wheel 27, but also around driven toothed wheels 32, 34, 45 carried by the flank 7A, see in particular FIGS. 1 and 3. Similarly, the opposite chain 33, adjacent to the flank 7B, is driven not only around the drive wheel 29, but also around three idle driven wheels 37, 38 and 39 (see also FIG. 2).

The overturning member 9D (FIG. 4), as well as the opposite overturning member 9B (FIG. 5), are fastened to the two endless chains 31, 33. Therefore, when the chains 31 and 33 move by means of the motor 25 through the shaft 21, the two overturning members 9D and 9B perform the same movement along the closed path defined by the chains 31 and 33.

The mechanical coupling between the overturning members 9B, 9D and the chains 31, 33 is so made that each overturning member rotates around an axis orthogonal to the planes where the chains 31, 33 lie. In the illustrated embodiment, each overturning member 9A-9D has a shaft 8 (see in particular FIGS. 4 and 5) that can be comprised of two portions 8A and 8B for each overturning member 9A-9D. Each shaft portion 8A, 8B is integral with the corresponding beams 13 forming the crossbar of the respective overturning member 9A-9D. Moreover, each shaft 8A, 8B is rotatably supported in a bushing 12. The bushings 12 and the shafts 8, 8A, 8B form rotation or oscillation hinges for the overturning members 9A-9D.

A respective bracket 14 is integral with each bushing 12; through said bracket the respective overturning member 9A-9D is fastened to the corresponding chain 31, 33. The ends of the shaft 8, i.e. the ends of the two portions 8A, 8B forming the shaft 8, are housed in respective endless guides 16 that may be provided on the inner surfaces of the two flanks 7A, 7B, the two guides 16 therefore facing each other (FIGS. 4 and 5). The ends of the shafts or shaft portions 8A, 8B may be provided with rollers, to cooperate with the respective guides 16, as shown in the attached figures.

The crossbars formed by the beams 13, the bushings 12, the shafts 8A, 8B and the brackets 14 form respective carriages or slides that are fastened to the flexible endless members 31, 33 in order to be translated along the closed path defined by said flexible endless members 31, 33.

In this way, it is possible to guide the overturning members along the closed path, allowing the rotation thereof around the axes B-B of the respective shafts 8, 8A, 8B. The ends of the shafts 8A, 8B may be provided with rollers to reduce friction at the area of engagement between the shafts and the guides 16.

Figure 5:
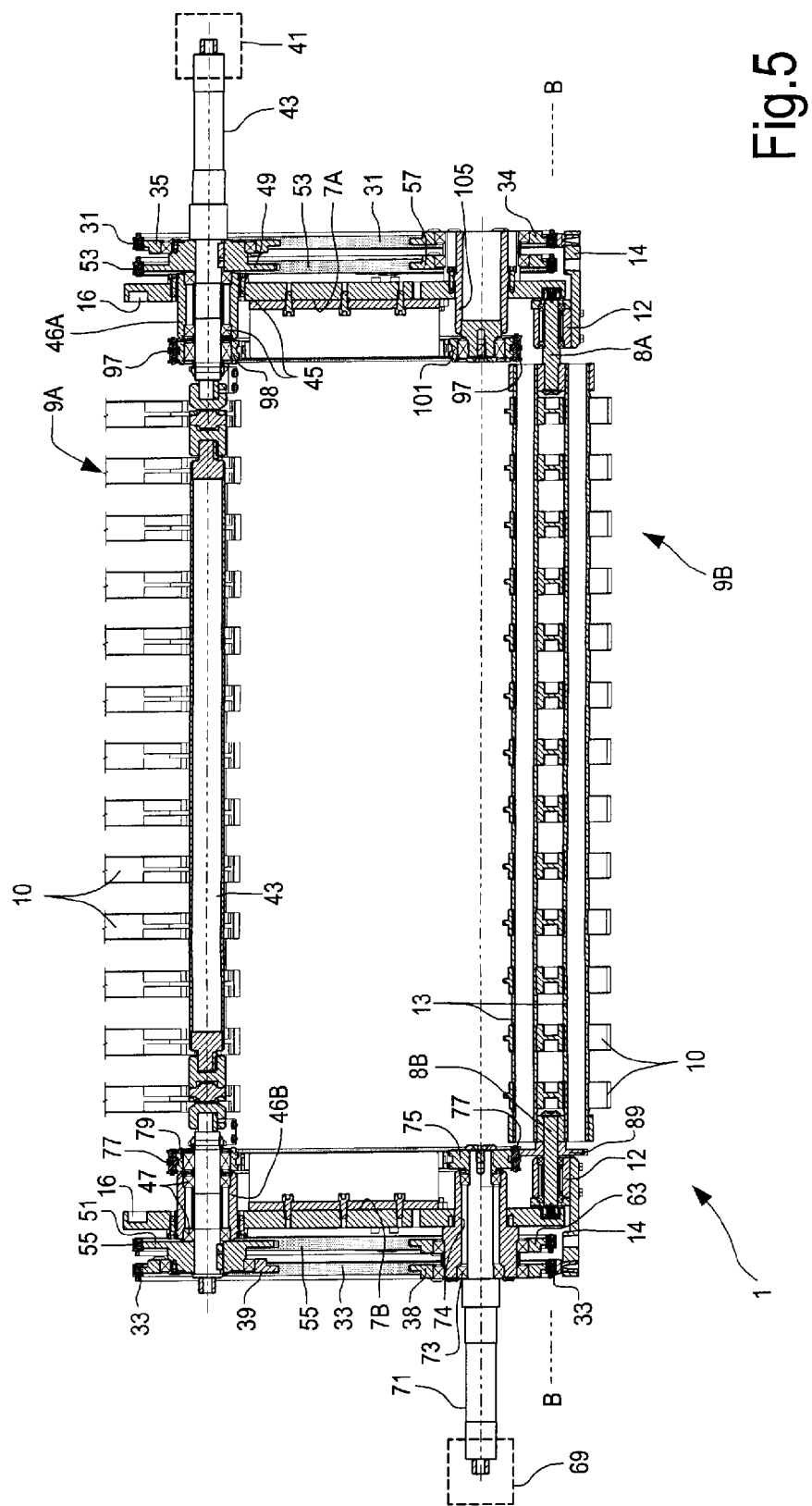
Figure 6:
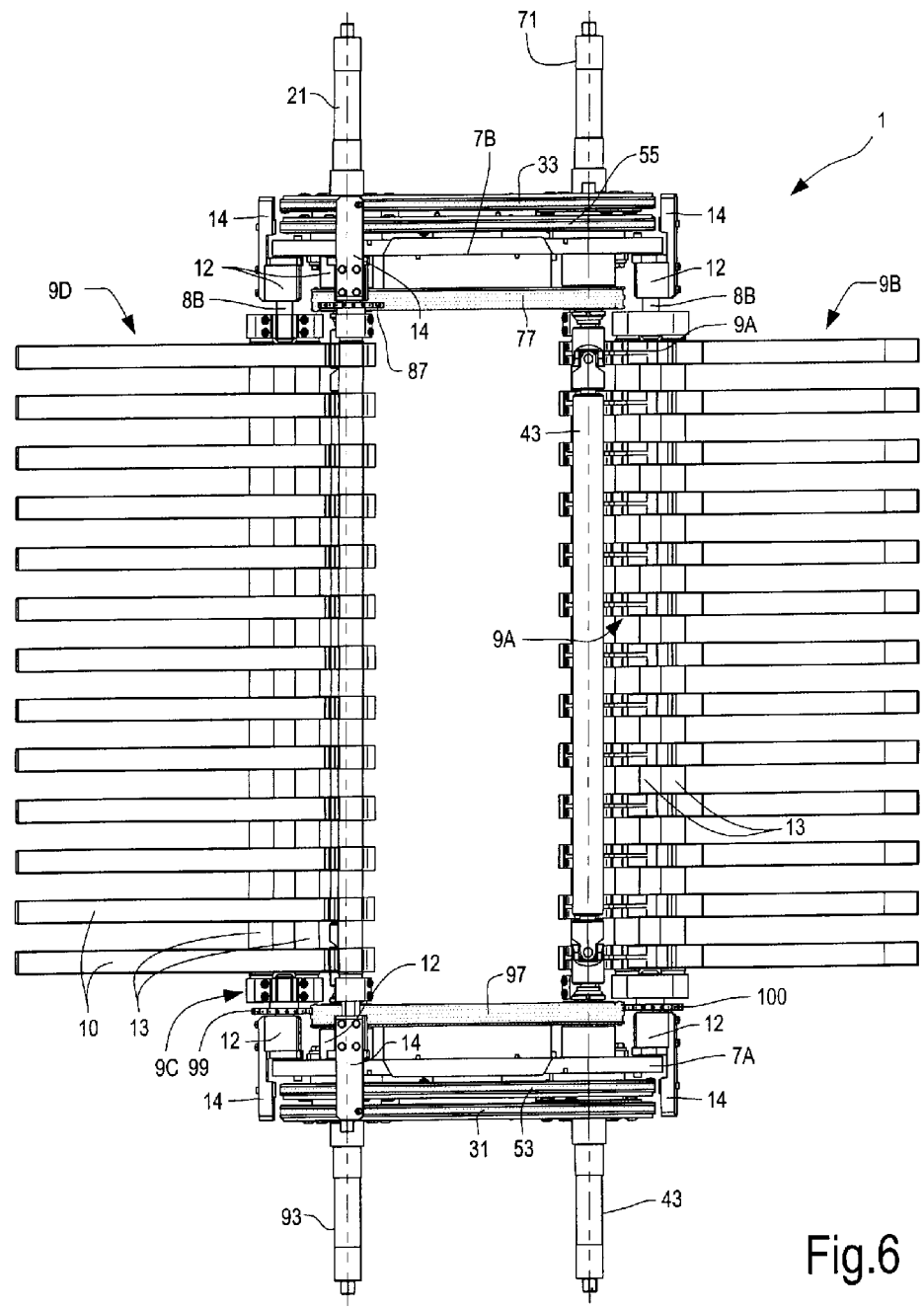

The two overturning members 9A and 9C move along the closed path by means of a second motor 41, schematically shown in FIG. 5. The motor 41 drives into rotation a transverse shaft 43 that, similarly to shaft 21, may be comprised of more sections joined by means of universal joints or the like. The shaft 43 is supported by means of bearings 45 and 47 on the flanks 7A and 7B respectively, through bushings 46A and 46B.

A toothed wheel 49 is keyed onto the shaft 43, near the end supported on the flank 7A. A second toothed wheel 51 is keyed onto the shaft 43, near the opposite end supported on the flank 7B. The toothed wheels 49 and 51 imparts motion to a chain 53 and to a chain 55, respectively. The two chains 53, 55 constitute flexible endless members forming a second conveyor, whose movement along the closed path causes the translation of the overturning members 9A and 9C, each of which is fastened, at two opposite points, to the two chains 53 and 55. In other embodiments, the flexible endless members 53, 55 are constituted by belts, preferably toothed belts.

The chain 53 on the flank 7A is driven not only around the drive wheel 49, but also around idle toothed wheels 57, 59 and 61. As shown in FIG. 4, the toothed wheel 61 is idly supported around the axis of the shaft 21 and is adjacent to the drive toothed wheel 27.

The opposite chain 55, to which the motion is imparted by means of the drive toothed wheel 51, is also driven around the idle wheels 65, 65 and 67, the wheel 67 being mounted idly on the axis of the shaft 21 (FIG. 4).

The overturning members 9A and 9C are fastened to the chains 53 and 55 and are thus moved by means of the motor 41.

To overturn the products P in the path segment from the entrance position 3 to the exit position 5, the overturning members 9A-9D shall be provided with a rotation movement around the axes of the respective shafts 8A, 8B parallel to the crossbars formed by the beams 13, the movement being coordinated with the translation movement of the endless conveyors formed by the pairs of chains 31, 33 and 53, 55.

To impart the rotation movement, suitable rotation mechanisms, described below, are provided. Similarly to the translation movement, wherein two motors 25, 41 control the translation movement of four overturning members 9A-9D along the closed path, in the illustrated embodiment only two motors are provided also for the rotation of the overturning members 9A-9D with respect to the conveyors formed by the chains 31, 33 and 53, 55. In this way, the rotation or oscillation of the overturning members 9A-9D around the axes of the shafts 8A, 8B is controlled in pairs: one motor controls the oscillation or rotation of the overturning members 9A, 9C, while the other motor controls the oscillation or rotation of the overturning members 9B, 9D.

FIG. 5 shows a motor 69 that controls the rotation of a shaft 71 supported by means of bearings 73 in a bushing 74 integral with the flank 7B. A toothed chain wheel 75 is keyed onto the shaft 71. The wheel 75 is preferably a wheel with double toothing, around which a flexible member is driven, for instance advantageously a double belt or chain 77. This constitutes a flexible endless member transferring the motion from the motor 69 to the overturning members 9B, 9D, as described below. The flexible endless member 77 extends along a closed path substantially parallel to the closed path of the conveyor formed by the pair of chains 31, 33. In the illustrated embodiment, the double chain 77 is inside the flank 7B and is driven not only around the drive wheel 75 but also around idle toothed wheels 79, 81 and 83 (se in particular FIGS. 4 and 5) carried on the flanks 7B. The double toothed wheel 81 is idly mounted on the shaft 21, while the toothed wheel 83 is idly mounted on a support 85 integral with the flank 7B.

Toothed pinions 87 and 89 engage the double chain 77. As shown in particular in FIGS. 6 and 7, the toothed pinion 87 is keyed onto the shaft 8B of the overturning member 9D. The toothed pinion 89 is keyed onto the shaft 8B of the overturning member 9B.

The movement of the chain 77 controlled by means of the motor 69 is coordinated with the forward or translation movement of the overturning members 9D and 9B along the closed path, caused by the movement of the conveyor formed by the pair of chains 31, 33 controlled by means of the motor 25. The combination of these two movements causes a rotation movement of the overturning members 9D, 9B around the respective axes B-B, that combines with the translation movement along the closed path defined by the guides 16 and by the conveyor 31, 33. By suitably actuating the motor 69, it is therefore possible to control the rotational component of the movement of the overturning members 9D and 9B around their rotation axis of the shafts 8A, 8B.

A substantially equal rotation mechanism is provided for the overturning members 9A and 9C. More in particular, as shown in FIG. 4, a fourth motor 91 drives a shaft 93 into rotation. The shaft 93 is supported on the flank 7A by means of bearings 94.

A double toothed wheel 95 for chain is keyed onto the shaft 93 (FIG. 4). A belt or preferably a double chain 97 is driven around the wheel 95, the chain forming a flexible endless member of the rotation mechanism of the overturning members 9A and 9C. The flexible endless member 97 extends along a closed path substantially parallel to the closed path of the conveyor formed by the pair of chains 31, 33, and therefore parallel to the closed path defined by the flexible endless member 97.

The double chain 97 is driven not only around the drive wheel 95 but also around toothed wheels 98, 101 and 103 (FIGS. 4 and 5). The idle toothed wheels 98 and 103 are mounted coaxially with the drive shafts 43 and 21, while the idle wheel 101 is supported on the flank 7A by means of an auxiliary support 105 (FIG. 5).

Pinions keyed onto the shafts 8A, 8B of the overturning members 9A, 9C mesh with the double chain 97. A toothed pinion 99 is shown in particular in FIGS. 6 and 7, keyed onto the shaft 8A, 8B of the overturning member 9C. In FIGS. 6 and 7 again, a toothed pinion 100 is shown, keyed onto the shaft 8A, 8B of the overturning member 9A. The movement imparted to the double chain 97 by means of the motor 91, combined with the translation movement controlled by means of the motor 41, therefore allows the overturning members 9A, 9C to perform the desired roto-translation movement.

Essentially, in the illustrated embodiment four motors 25, 41, 69 and 91 are used to control the movement of the overturning members 9A-9D. A first pair of motors 41, 25 controls the movement of the two conveyors formed by the chains or flexible members 31, 33 and 53, 55 respectively. The two motors 69, 91 control the movement of the two flexible endless members or chains 77 and 97. The movement of the conveyors formed by the endless chains 31, 33 and 53, 55 causes the drawing of the overturning members 9A-9D along the guides 16 defining the closed path. The toothed pinions 87, 89, 99 and 100 mesh with the chains or flexible endless members 77 and 97. The movement of the chains or flexible endless members 77, 97 coordinated with the movement of the conveyors 31, 33 and 53, 55 imparts the overturning members 9A-9D the rotation movement around the axes B-B of the respective shafts 8, 8A, 8B.

It should be understood that in other embodiments a different number of overturning members can be provided, for example always an even number of overturning members, which may be controlled by means of two motorization systems for the translation of the endless conveyors to which they are fastened, and two motorization systems for the rotation or oscillation of the overturning members. Vice versa, in other embodiments each overturning member may be provided with an own endless conveyor with an own motorization and an own autonomous endless member, with a corresponding motor controlling the rotation thereof around the axis of the shaft 8A, 8B.

The operation of each overturning member 9A-9D and the movement thereof may be better understood by means of the sequence illustrated in FIGS. 8A-8E. In these figures only one overturning member 9 is shown. The other members have been omitted for the sake of clarity of representation; it shall however be understood that each overturning member 9A-9D performs the same movement along the closed path defined by the guides 16 and by the conveyors 31, 33 and 53, 57.

Figure 8B:
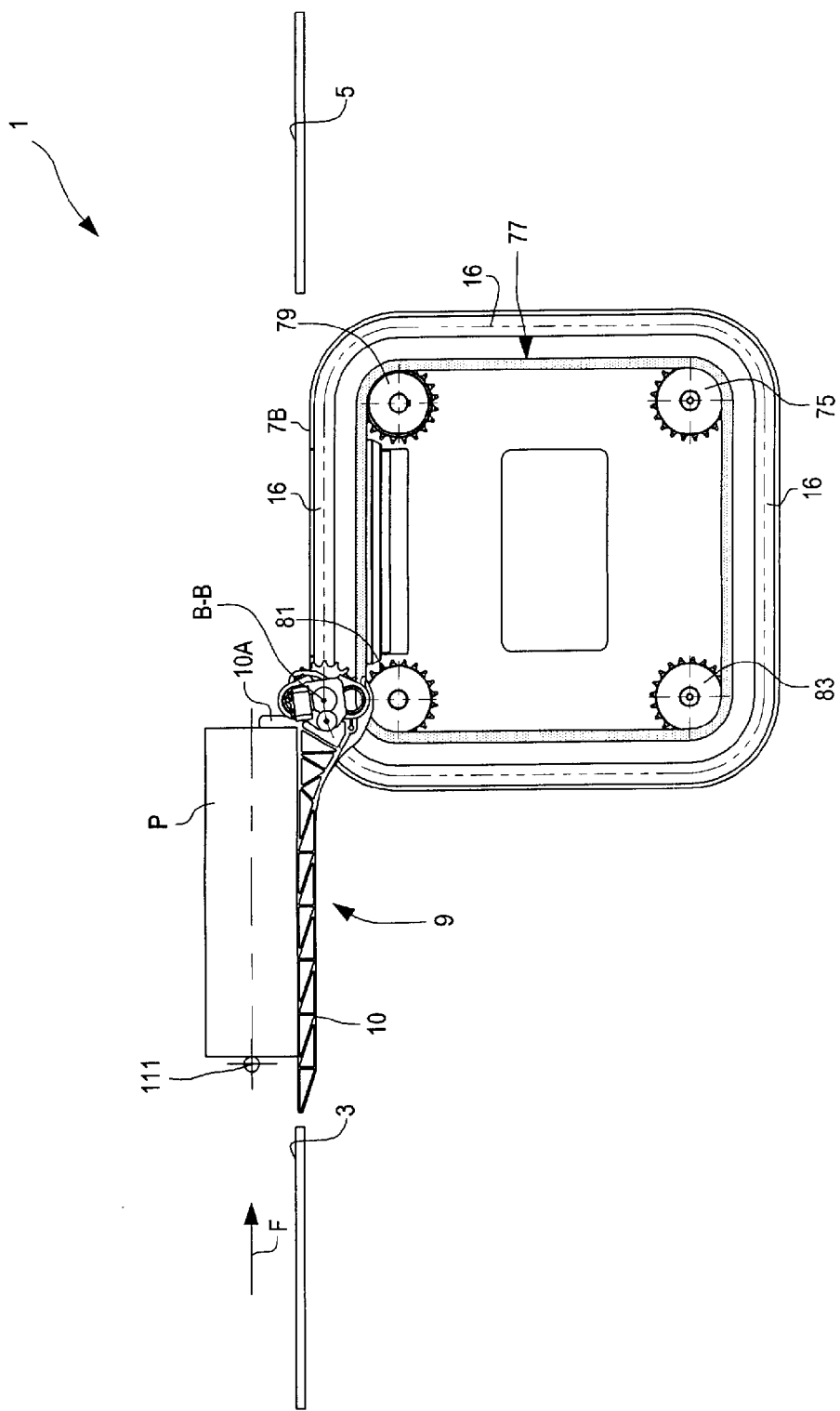

In FIG. 8A, the overturning member 9 has the fingers 10 arranged substantially horizontal, in front of the entrance position 3 of the products P. A product P is arranged on a plane representing the entrance position 3, and may be pushed by means of a feeding bar 111, known in se, that moves the product P forward according to the arrow F, until the product is placed onto the fingers 10 against the appendices 10A, as shown in FIG. 8B. The appendices 10A form abutments for stopping and positioning the product P.

Figure 8C:
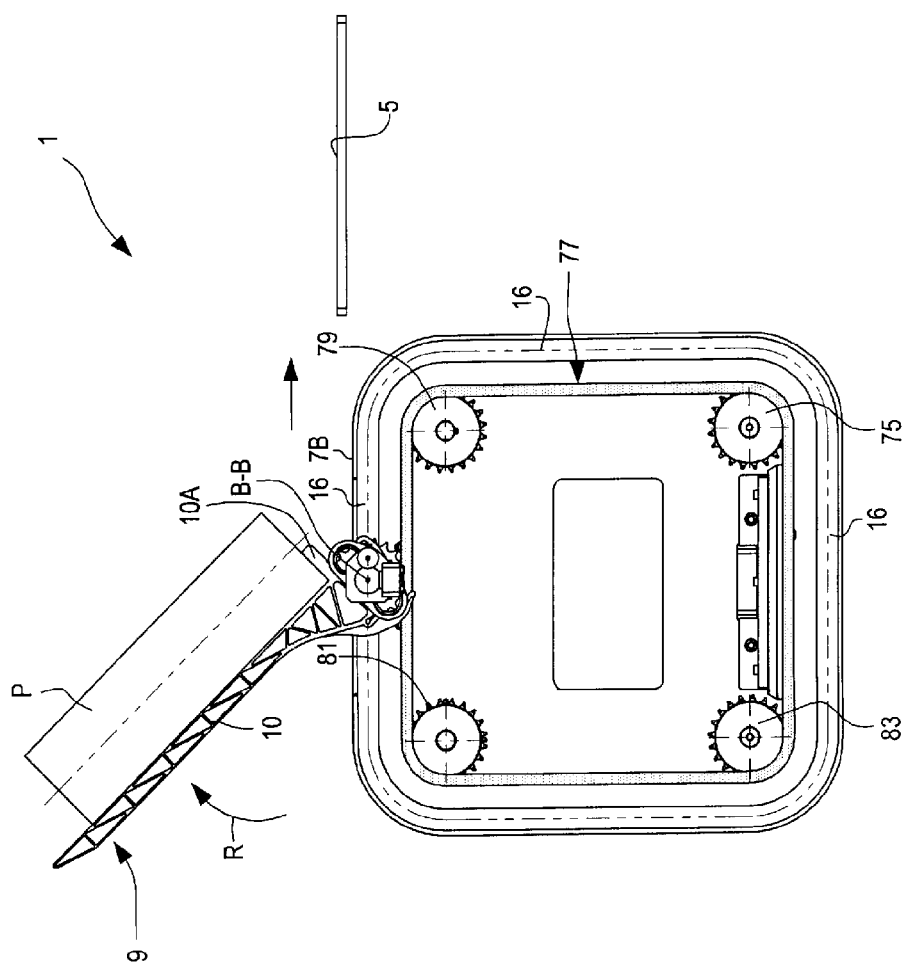

FIG. 8C shows the subsequent step, wherein the overturning member 9 has begun the stroke towards the exit position 5. Whilst it translates along the horizontal closed path segment between the entrance position 3 and the exit position 5, it begins to rotate according to arrow R. The roto-translation movement of the overturning member 9 is controlled by the combination of the motion imparted by motor 41 or 25 and by motor 69 or 91.

Figure 8D:
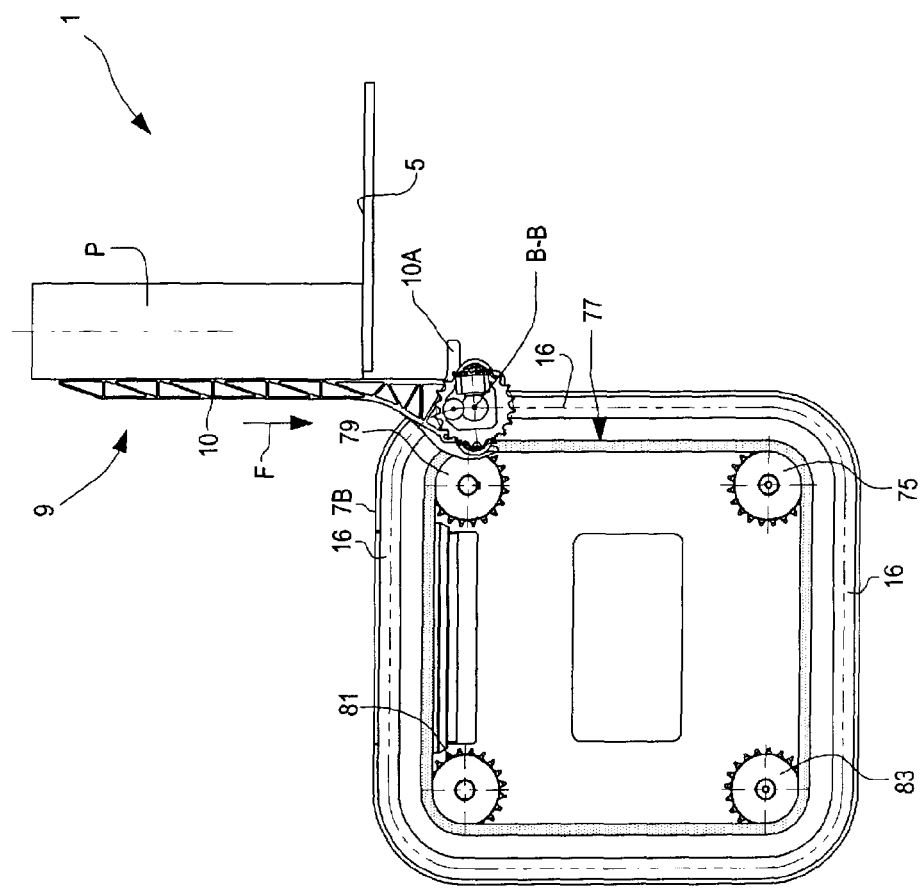
Figure 8E:
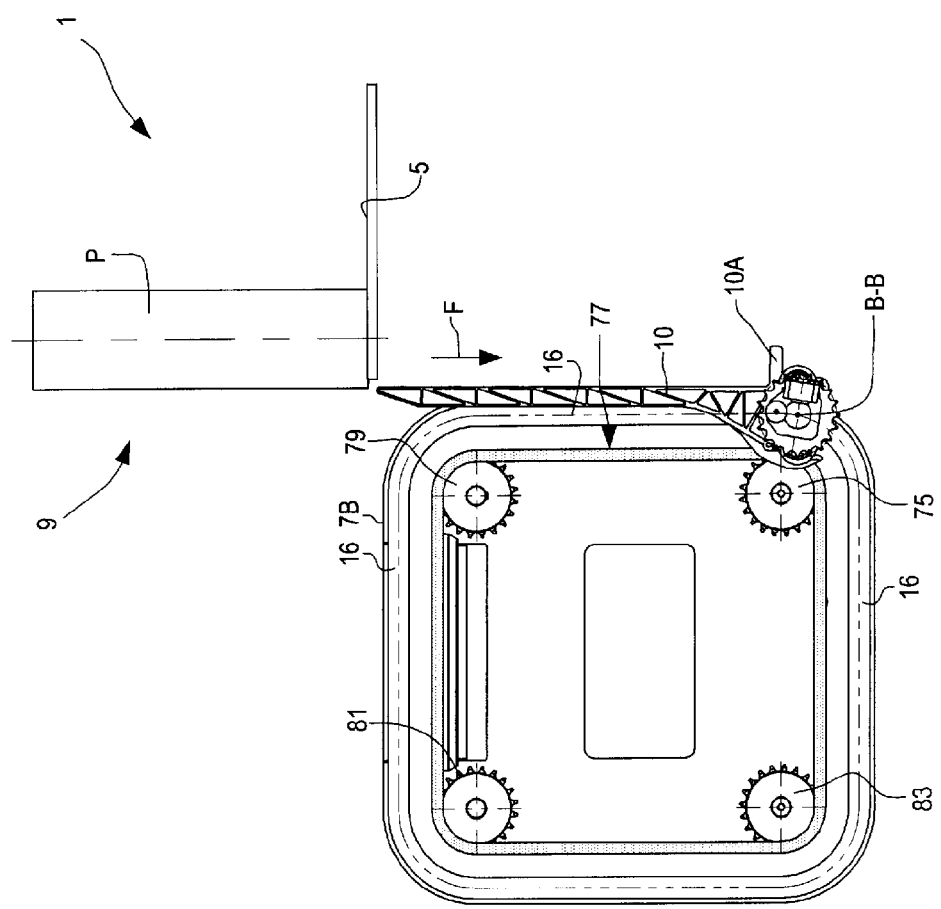

In FIG. 8D the product P has achieved the plane or surface defining the exit position 5, pushed by means of the fingers 10 that have achieved the vertical position. The movement of the overturning member 9 continues along the descending vertical segment defined by the guide 16, so as to move downwards until it is below the plane defining the exit position 5, as shown in FIG. 8E. Again, the downward translation movement performed by the overturning member 9 in the movement illustrated in FIGS. 8D and 8E is provided by the suitable combination of the movements of the two motors controlling the translation and the rotation of the overturning member 9.

By comparing FIGS. 8D, 8E, it is clearly apparent that the overturning member 9, being controlled by a movement of simple downward vertical translation, may be removed from the trajectory of the product P, without interfering therewith, even if the product P remains on the plane defining the exit position 5, or even if it moves away from this position very slowly. Substantially, the removal movement of the overturning member 9 does not require, therefore, that the product P moves away from the position on the plane or surface defining the exit position 5 where it has been released by the overturning member 9. The removal of the overturning member 9 with respect to the product P released in the exit position may be therefore very fast and independent of how the product P moves once it has been released on the exit surface in the position 5.

From the arrangement of FIG. 8E the overturning member 9 returns in the position of FIG. 8A, passing through the positions illustrated in FIG. 3 for the overturning members 9B and 9C.

Substantially, with the combination of the mechanical members described above, along the active path, i.e. along the horizontal segment of the closed path defined by the guides 16, a translation and overturning movement of the products P is achieved, wherein the products arrive on the plane 3 and are released on the plane 5 substantially at the same height.

The use of independent motors to control on the one hand the movement of the conveyors 31, 33 and 53, 57 and, on the other hand, the movements of the flexible members formed by the double chains 77, 97, allows to modify the movement of the overturning members 9A-9D according, for example, to the needs of the different products P to be processed. More in particular, even if, in general, each overturning member 9A-9D is in a horizontal position when it is in front of the entrance position 3, and in a vertical position when it is in front of the exit position 5, the rotation according to the arrow R between the two positions 3 and 5 may be modulated suitably to optimize the handling of products P.

For example, it is possible to modulate the 90° rotation uniformly along the entire upper rectilinear segment between the entrance position 3 and the exit position 5; otherwise, it is possible to make a faster first rotation and a slower second rotation, so as to control the product more safely, avoiding the product from falling forward due to inertia.

In some embodiments a device may be also provided to hold or break the product during the rotation, in order to keep it into contact with the overturning member and to avoid jams. Brushes or wheels may be for instance used, against which the upper part of the product slides during the rotation.

In some embodiments, the entrance position 3 intersects at least partially the trajectory of the overturning members 9 so as to load the products P onto them. Fixed supports may be for instance provided, on which the product P, transported by a drawing bar, slides; or belts may be used, preferably having a round cross-section, transporting the product up to the abutments 10A.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims.

What is claimed is:

1. A device to feed products from an entrance position to an exit position, comprising a closed path, along which overturning members move, which are configured to pick products in the entrance position and to release the products in the exit position; wherein the overturning members are configured and arranged to perform, along a segment of said closed path comprised between the entrance position and the exit position, a rotation by about 90°, in order to overturn the products while translating the products from the entrance position to the exit position along said segment of said closed path; wherein each overturning member of the overturning members is fastened to a respective endless conveyor extending along the closed path and moved by a respective first motor; wherein said each overturning member is hinged around a rotation axis transverse with respect to the closed path, so as to rotate around said rotation axis with respect to the endless conveyor to which said each overturning member is fastened; wherein said each overturning member cooperates with a respective rotation mechanism controlling rotation of the overturning member around the rotation axis thereof, according to a position of the overturning member along the closed path; wherein the rotation mechanism comprises a flexible endless member actuated by a respective second motor; and wherein movement of the flexible endless member controlled by the second motor and movement of the endless conveyor controlled by the first motor are coordinated so as to cause translation and overturning of a respective overturning member associated therewith, between the entrance position and the exit position of the products.

2. The device according to claim 1, wherein the flexible endless member extends along a closed path substantially parallel to the closed path of the endless conveyor.

3. The device according to claim 1, wherein the entrance position and the exit position are approximately at a common height.

4. The device according to claim 1, wherein the overturning members are subdivided into at least two groups, each group of overturning members is combined with a respective first motor, controlling a translation of the overturning members of the respective group of overturning members along the closed path; and each group of overturning members is combined with a respective second motor, controlling the rotation of the overturning members of the respective group of overturning members around respective rotation axes of the overturning members transverse with respect to the closed path.

5. The device according to claim 4, wherein pairs of contiguous overturning members along the closed path belong to two different groups of overturning members.

6. The device according to claim 1, further comprising at least two endless conveyors, to which at least one overturning member is fastened; and further comprising two rotation mechanisms, each of which controls rotation of at least one overturning member.

7. The device according to claim 6, wherein rotation of all the overturning members fastened to a respective endless conveyor is controlled by a common rotation mechanism, the device comprising a number of rotation mechanisms equal to a number of the endless conveyors.

8. The device according to claim 1, wherein several overturning members are associated with each endless conveyor.

9. The device according to claim 8, wherein contiguous overturning members along the closed path are controlled by different endless conveyors.

10. The device according to claim 1, wherein each rotation mechanism controls rotation of several overturning members.

11. The device according to claim 10, wherein rotation of contiguous overturning members along the closed path is controlled by different rotation mechanisms.

12. The device according to claim 1, wherein each endless conveyor comprises at least one pair of flexible endless members substantially parallel to and spaced from each other, each overturning member being arranged between respective flexible endless members of said pair of flexible endless members of the endless conveyor and being fastened thereto.

13. The device according to claim 1, wherein several overturning members are associated with each endless conveyor, wherein contiguous overturning members along the closed path are controlled by different endless conveyors, wherein each endless conveyor comprises at least one pair of flexible endless members substantially parallel to and spaced from each other, each overturning member being arranged between respective flexible endless members of said pair of flexible endless members of the endless conveyor and being fastened thereto, and wherein the first motor drives into rotation a drive shaft, onto which motorized wheels are keyed to actuate the pair of flexible endless members of the endless conveyor, and wherein on said drive shaft, a guide wheel of the flexible endless member of the rotation mechanism is idly supported.

14. The device according to claim 1, further comprising two flanks, onto which the endless conveyor is supported, and wherein said flanks comprise guides extending along the closed path, in order to guide the overturning members along the closed path.

15. The device according to claim 1, wherein each overturning member comprises a carriage movable along the closed path.

16. The device according to claim 15, wherein the carriage comprises a crossbar, onto which fingers for supporting the products are fastened, the crossbar rotating around the respective rotation axis.

17. The device according to claim 16, wherein the crossbar comprises two parallel beams, supported by at least one support shaft extending according to the rotation axis and rotatably connected to respective supports constrained to the respective endless conveyor; wherein the support shaft is subdivided into two portions connected to each other by the crossbar; and wherein ends of the support shaft are engaged and guided in guides of the flanks.

18. The device according to claim 5, further comprising a plurality of overturning members fastened to a common endless conveyor actuated by the first motor.

19. The device according to claim 17, further comprising a plurality of overturning members fastened to a common endless conveyor actuated by the first motor.

20. The device according to claim 1, wherein the closed path comprises at least one rectilinear segment extending between the entrance position and the exit position, and wherein said segment is horizontal.

21. The device according to claim 1, wherein the closed path comprises a return portion from the exit position to the entrance position, having a substantially vertical segment, starting adjacent the exit position, wherein along said substantially vertical segment the overturning members are controlled so as to perform a simple downward translation movement so as to move, without rotation, below a surface where the products are released in correspondence of the exit position.

22. A device to feed products, comprising:

an entrance position for the products;

an exit position for the products;

a closed path, along which overturning members move, which are configured to pick the products in the entrance position and to release the products in the exit position;

a first endless conveyor and a second endless conveyor extending along the closed path, actuated by respective first motors; at least one respective overturning member of the overturning members is hinged to each first endless conveyor and said second endless conveyor so as to rotate around a rotation axis transverse with respect to the closed path;

a first rotation mechanism configured and arranged to control rotation of the overturning member hinged to the first endless conveyor; the first rotation mechanism comprising a respective flexible endless member actuated by a respective motor;

a second rotation mechanism configured and arranged to control rotation of the overturning member hinged to the second endless conveyor; the second rotation mechanism comprising a respective flexible endless member actuated by a respective motor.

23. A device to feed products, comprising:

an entrance position for the products;

an exit position for the products;

a closed path, along which overturning members move, which are configured to pick the products in the entrance position and to release the products in the exit position;

at least one endless conveyor extending along the closed path and moved by a first motor;

at least one overturning member hinged to the endless conveyor around a rotation axis transverse with respect to the closed path;

a rotation mechanism configured and arranged to control rotation of the overturning member hinged to the first endless conveyor; the first rotation mechanism comprising a respective flexible endless member actuated by a respective second motor;

wherein the first motor and the second motor are controlled synchronously, so as to cause a rotation by about 90° of the overturning member between the entrance position and the exit position of the products.

24. The device according to claim 23, wherein the flexible endless member defines a closed path substantially parallel to the closed path along which the endless conveyor extends.

* * * * *